US008654240B2

(12) United States Patent
Vakrat et al.

(10) Patent No.: US 8,654,240 B2
(45) Date of Patent: *Feb. 18, 2014

(54) OPTICAL CHROMATIC ABERRATION CORRECTION AND CALIBRATION IN DIGITAL CAMERAS

(75) Inventors: Dudi Vakrat, Nethanya (IL); Victor Pinto, Zychron-Yaakov (IL)

(73) Assignee: CSR Technology, Inc., Sunnyvale, CA (US)

(*) Notice: Subject to any disclaimer, the term of this patent is extended or adjusted under 35 U.S.C. 154(b) by 36 days.

This patent is subject to a terminal disclaimer.

(21) Appl. No.: 13/342,153

(22) Filed: Jan. 2, 2012

(65) Prior Publication Data

US 2012/0098996 A1    Apr. 26, 2012

Related U.S. Application Data

(63) Continuation of application No. 11/753,732, filed on May 25, 2007, now Pat. No. 8,089,555.

(51) Int. Cl.
*H04N 5/225* (2006.01)
*H04N 17/02* (2006.01)
*G06K 9/40* (2006.01)

(52) U.S. Cl.
USPC .......................... 348/335; 348/187; 382/275

(58) Field of Classification Search
USPC ........... 348/187–188, 335, 360–361; 382/275
See application file for complete search history.

(56) References Cited

U.S. PATENT DOCUMENTS

| 4,466,018 | A | 8/1984 | Soneda et al. |
| 5,713,053 | A | 1/1998 | Hiral |
| 6,788,822 | B1 | 9/2004 | Zhang et al. |
| 6,807,299 | B2 | 10/2004 | Sobol |
| 6,822,762 | B2 | 11/2004 | Moroney et al. |
| 6,862,373 | B2 | 3/2005 | Enomoto |
| 7,088,388 | B2 | 8/2006 | MacLean et al. |
| 7,158,686 | B2 | 1/2007 | Gindele |
| 7,973,850 | B2 | 7/2011 | Ishiga |
| 8,089,555 | B2 | 1/2012 | Vakrat et al. |
| 8,194,136 | B1 * | 6/2012 | Askey et al. ................. 348/187 |
| 2003/0038957 | A1 | 2/2003 | Sharman |
| 2004/0150732 | A1 | 8/2004 | Yamanaka |
| 2004/0227978 | A1 | 11/2004 | Enomoto |
| 2005/0162532 | A1 | 7/2005 | Toyoda |

(Continued)

OTHER PUBLICATIONS

Boult, "Correcting Chromatic Aberrations Using Image Warping," Center for Research in Intelligent Systems, Columbia University, Department of Computer Science, 1992, 15 pages.

(Continued)

*Primary Examiner* — Lin Ye
*Assistant Examiner* — Mekonnen Dagnew
(74) *Attorney, Agent, or Firm* — Perkins Coie LLP (57) ABSTRACT

Methods and the corresponding device are presented for the correction of lateral chromatic aberration within a digital camera or other imaging device, using calibration approaches that do not require previously acquired lens data to effect the correction. An in-camera auto-calibration procedure is performed on the attached lens, such as when a lens is exchanged, and extracts parameters required for chromatic aberration correction, respecting zoom and focus, from one or more captured images. Based on image data extracted as a plurality of channels of a chromatic decomposition of the image, the chromatic aberration information for the lens is extracted. From the chromatic aberration information, the correction factors for the lens are determined.

30 Claims, 4 Drawing Sheets

(56) References Cited

U.S. PATENT DOCUMENTS

2006/0061664 A1* 3/2006 Ito .............................. 348/211.11
2006/0062562 A1   3/2006 Utagawa
2006/0232681 A1  10/2006 Okada
2007/0103744 A1*  5/2007 Chiba ........................... 358/518

OTHER PUBLICATIONS

Boult, "Local Image Reconstruction and Sub-Pixel Restoration Algorithms," Graphical Models and Image Processing, vol. 66, No. 1, Jan. 1993, pp. 1-12.
Choudhury, et al., "The Trilateral Filter for High Contrast Images and Meshes," Eurographics Symposium on Rendering, 2003, pp. 1-11.
Duran, et al., "Fast Bilateral Filtering for the Display of High-Dynamic Range Images," *ACM Transactions on Graphics, Special Issue on Proc. of ACM Sig-Graph*, 2002, San Antonio, Texas, vol. 21(3), pp. 249-256.
Fattal, et al., "Gradient Domian High Dynamic Range Compression," *ACM Transactions on Graphics, Special issue on Proc. of ACM Sig-Graph*, 2002, San Antonio, Texas, vol. 21(3), pp. 257-266.
Gilboa, et al., "Complex Diffusion Processes for Image Filtering," *Proc. Conf. Scale-Space-Space*, 2001, pp. 299-307.
Perona, et al., "Scale-Space and Edge Detection Using Anisotropic Diffusion," University of California Berkeley, Dec. 20, 1988, pp. 1-30.
Tomasi, et al., "Bilateral Filtering of Greay and Colored Images," Proc., IEEE Intl. Conference on Computer Vision, 1988, pp. 836-846.
Wong, "Image Enhancement by Edge-Preserving Filtering," *First IEEE International Conference on Imaging Processing*, Austin, Texas, Nov. 13-16, 1994, 6 pages.
Co-Pending U.S. Appl. No. 11/753,732 of Vakrat, D., et al., filed May 25, 2007.
Notice of Allowance Mailed Sep. 23, 2011 in Co-Pending U.S. Appl. No. 11/753,732 of Vakrat, D., et al., filed May 25, 2007.
Advisory Action Mailed Oct. 12, 2010 in Co-Pending U.S. Appl. No. 11/753,732 of Vakrat, D., et al., filed May 25, 2007.
Final Office Action Mailed Jul. 22, 2010 in Co-Pending U.S. Appl. No. 11/753,732 of Vakrat, D., et al., filed May 25, 2007.
Non-Final Office Action Mailed Feb. 22, 2010 in Co-Pending U.S. Appl. No. 11/753,732 of Vakrat, D., et al., filed May 25, 2007.

* cited by examiner

OPTICAL CHROMATIC ABERRATION CORRECTION AND CALIBRATION IN DIGITAL CAMERAS

This is a continuation of U.S. patent application Ser. No. 11/753,732, filed on May 25, 2007, now U.S. Pat. No. 8,089,555 which is incorporated herein by reference in its entirety.

BACKGROUND

This application relates to image processing in digital cameras and other electronic digital image acquisition devices, and particularly to the correction of chromatic aberration and the calibration of the device for this purpose.

For the optical material used in lenses, light of different wavelengths will have different indices of refraction. As a result, lenses typically have some degree of lateral chromatic aberration. Lateral chromatic aberration appears as false colors in an image that grow stronger as the distance from the center of the image increases. Improving the optics can reduce the amount of aberration, but digital technology allows for the ability to "fix" the image by using one color channel (such as green in a RGB breakdown) as a reference channel and compensating the other channels (such as red and blue) with respect to the reference channel.

Typically, digital cameras use chroma low-pass filtering to remove false colors in the image, including those created by lateral chromatic aberration. However, this solution has several shortcomings and will generally not provide sufficient image quality for several reasons. A first of these is that in the case of a strong chromatic aberration, chroma low-pass filtering will not be able to remove the false colors effectively, but will instead smear them. Another is that chroma low-pass tittering will blur the chromatic edges in the image. Of course, another way to address the problem is by simply enhancing the optical system of the camera; however, this may be prohibitively expensive for most applications. A third method employed by prior art systems is to correct lateral chromatic aberration outside the camera, according to lens data and focal length information, acquired when the image was captured and saved together with the image.

As the trend is to lower lens cost, because the lens is a significant portion of the camera's bill of material, it is likely that lower cost lenses will be increasingly used. This will cause chromatic aberration effects to become even a greater problem. Consequently, the need for improved digital image processing solutions to resolve chromatic aberration effects is increasing, since they facilitate digital camera cost reduction, without a concomitant decrease in image quality. This is particularly true of methods that can be executed on camera without increasing image processing time, as camera manufacturer's demands in terms of reduced click to click time, are increasing. Further, since as aberration is lens dependent, there is also a needed for improved methods for calibrating the aberration correction mechanism for the lens being used. The need for improved calibration is present not just for camera bodies that can accept different lens, but also for camera with a single permanently attached lens, as these tend to have less expensive optics where the actual lens values are more likely to differ from the expected nominal values.

SUMMARY

Methods and the corresponding device are presented for the correction of lateral chromatic aberration within a digital camera or other imaging device, using calibration approaches that do not require previously acquired lens data to effect the correction. An in-camera auto-calibration procedure is performed on the attached lens, such as every time the lens is exchanged, and extracts parameters required for chromatic aberration correction, respecting zoom and focus, from one or more captured images. Based on image data extracted as a plurality of channels of a chromatic decomposition of the image, the chromatic aberration information for the lens is extracted. From the chromatic aberration information, the correction factors for the lens are determined.

According to one set of aspects, a lens is used to acquire image data, from which chromatic aberration information is extracted. From this extracted chromatic aberration information, correction factors for the lens for one or more chromatic channels (for example, for red or blue) can then be determined, where both the extracting of the chromatic aberration information and the determination of correction factors can be performed by an on-camera image processor. According to other aspects, the imaging system itself can project (such as from a flash) a test pattern to use in the process. According to other aspects, software can be provided to allow a user to print out a test pattern.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION OF EXEMPLARY EMBODIMENTS

The described approach for correcting lateral chromatic aberration 111 digital cameras is to perform radial scaling of the red and blue components of the image (separately) to match the green component of the image. Scaling can be performed on the raw data (such as in a Bayer image format) using a filter incorporated in the image processing pipe of the digital camera, thereby achieving effective correction of lateral chromatic aberration, without increasing processing time, and with no significant hardware costs. In order to effect this methodology, the methodology includes an in camera auto-calibration procedure. This procedure can be performed when the lens is exchanged by extracting parameters required for lateral chromatic aberration correction from one or more captured images in a process that can also respect zoom and focus. In contrast to prior art approaches, no a priori infoml ation regarding the lens characteristics is required. Consequently, the correction of lateral chromatic aberration within a digital camera can be performed without increasing image processing time, using calibration approaches that do not require previously acquired lens data to effect the correction.

The various aspects presented here can provide a number of advantages. A first of these is the ability to provide digital cameras with higher image quality, especially in wide angle shots, without increasing the time the user must wait between image captures ("click to click time"). Another advantage is the ability to employ simpler optical systems in a camera product, and thereby significantly reduce the costs of the digital cameras. They also offer manufactures of non-exchangeable lens digital cameras (compact digital cameras) the ability to employ an auto-calibration procedure that serves as a fast mechanism for finding the parameters needed for effective correction of lateral chromatic aberration, without requiring additional information from the manufacturer of the lens used. This can also compensate for lens-to-lens variations.

For the case of interchangeable lenses, it is possible to provide effective correction of lateral chromatic aberration for any lens that can physically mount on the camera and operate, regardless of lens manufacturer. Without the "in-camera auto-calibration procedure", a Digital Single Lens Reflex (DSLR) camera would only be able to provide effective correction of lateral chromatic aberration for a limited number of lenses. Supporting new lenses would only be possible by the camera user downloading the lens parameters needed for effective lateral chromatic aberration correction from the Internet, or obtaining them from memory incorporated in the lens itself. In either case, the camera manufacturer must calculate these parameters in advance. Using the described in-camera auto-calibration procedure, DSLR manufacturers can provide lateral chromatic aberration correction in their cameras regardless of the lens employed by the user, without the need to distribute lens-related information to users through the Internet, or by means of costly on-lens data storage mechanisms. For example, an end user of the camera could perfornl the process at the time of lens interchange. This could be newly done each time a lens is attached or settings could be saved for various lens.

Figure 1:
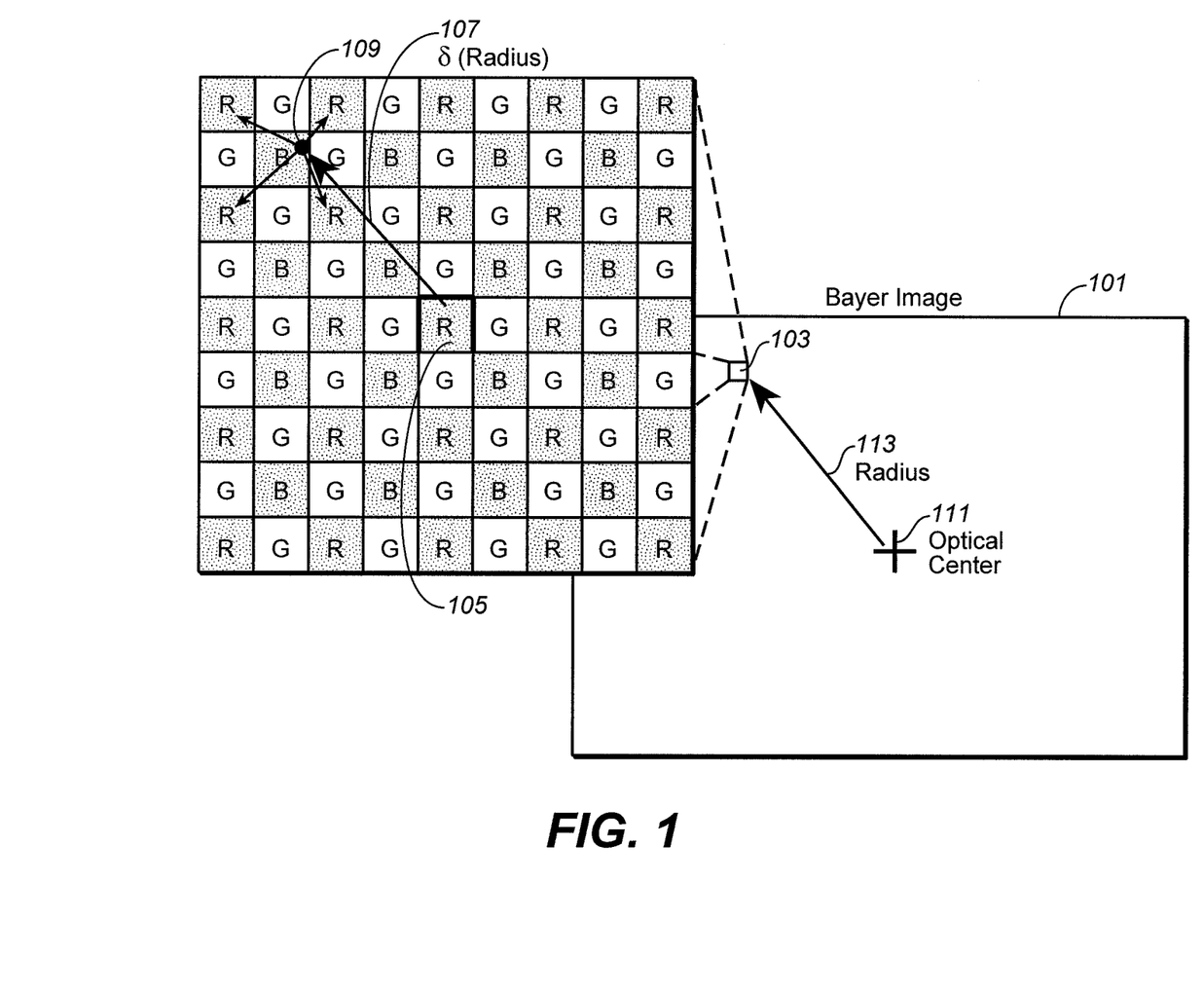
FIG. 1 is an example of the described methodology operating on a specific pixel.

In the exemplary embodiment, the technology performs radial scaling on the red and blue channels, using a 9×9 filter which is incorporated in the image processing pipe, and operates on the raw data (Bayer image) coming from the digital camera's image sensor. FIG. 1 illustrates this example of the methodology operating on the 9×9 window surrounding a specific pixel. The raw data is represented by 101 and has it optical center at 111. The 9×9 window 103, surrounding a specific pixel, is displaced from this center by the radius 113. The grid 103 is then shown enlarged, where the individual R, G, and B elements are shown and the central R element 105 being the specific pixel on which the window is based. Due to the chromatic aberration, the red pixel element at a radius 113 will be displaced by the additional distance o (radius) 107 from 105 to point 109, where, in terms of the quantities defined below, δ (radius) corresponds to the square root of $((\text{delta\_x})^2+(\text{delta\_y})^2)$.

More generally, it will be understood that other Size windows can be used. Additionally, although the description is given in terms of the standard breakdown of an image into the R, G, and B channels and the green channel, corresponding to frequencies between the R and B channels, is used a the "reference" channel with respect to which corrections of the R and B channels are made, the methodology readily extends to other decompositions of an image, both within and beyond the visual range, into two or more chromatic channels where one channel is taken as the reference channel and one or more of the other channels corrected for chromatic aberration relative to this reference channel. Even for embodiments based on the use of data in the Bayer image format, although green is preferred as the reference channel as it appears twice as often as the red or blue channel, resulting in less computations for the correction factors, red or blue could also be used as the reference channel. Alternately, all of the channels may corrected by, for example, finding scaling factors that maximize the correlation between all channels over the whole of the image.

Further, it should be noted that although the present discussion is primarily given in terms in the "raw data" being presented in a Bayer image format, the invention is not so limited; rather, as a Bayer image decomposition is commonly used in the art, a typical implementation of the present invention will use a Bayer image grid and it is therefore a reasonable embodiment on which to base the discussion. More generally, however, the process can be based on "raw data" (in the sense of image data prior to "demosaicing") in other formats. For example, although most current digital cameras use the Bayer image grid format, there are other image sensors that exhibit the property of allowing each sensor element to produce a signal indicative of the color of light falling on the sensor. (A technically simple approach of achieving this same objective would be to use a rotating color filter wheel in front of the sensor, and capture three (for the RGB case) different black and white images in rapid succession, each containing the chromaticity data for a single one of the 3 color channels in the image.) Additionally, for whatever format is used, although the exemplary embodiments use the image data coming from the sensor before other image processing is applied in order to achieve maximum quality of chromatic aberration correction, the process may be executed at other points along the imaging pipeline.

Exemplary Embodiment

Figure 2:
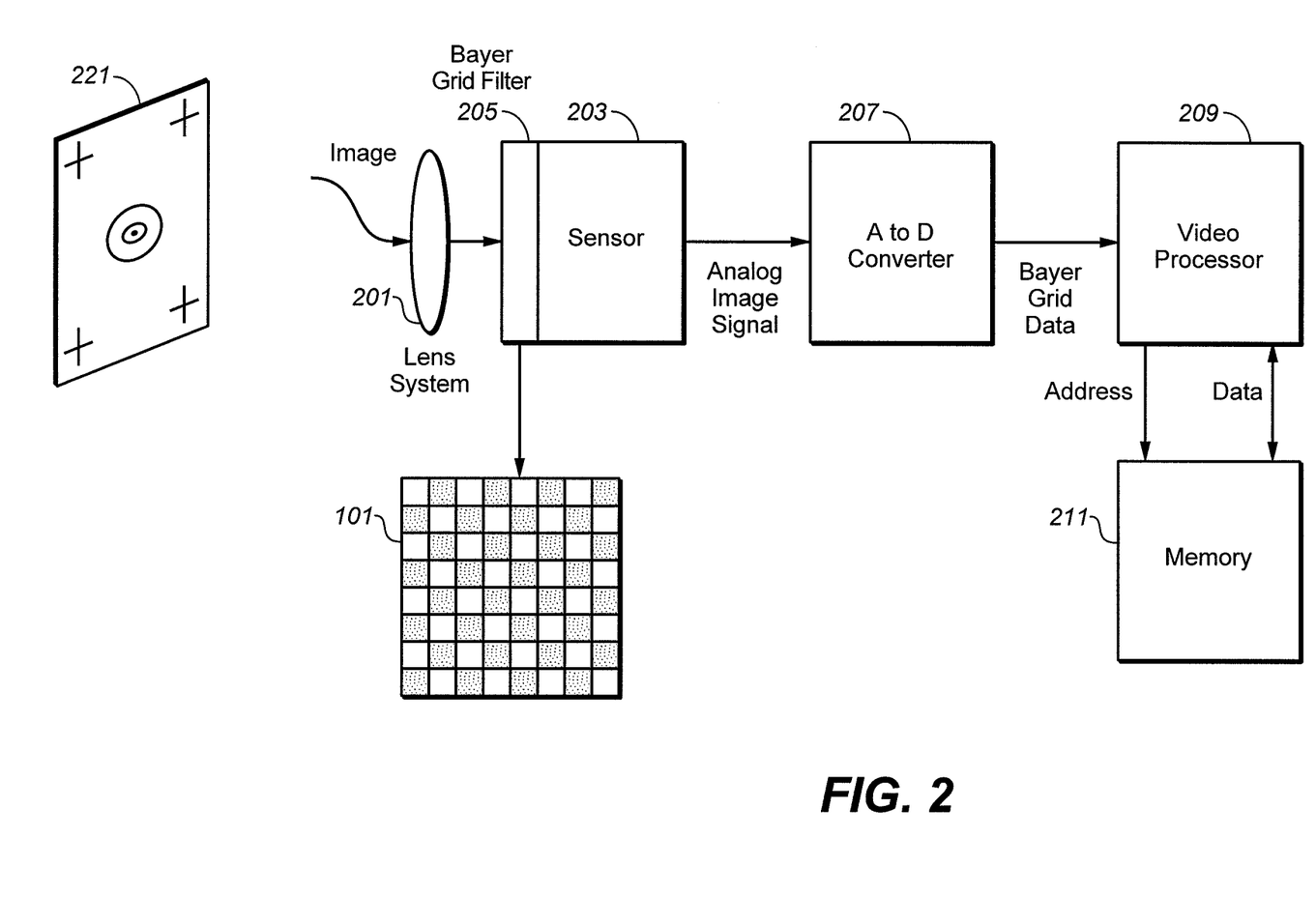
FIG. 2 is a block diagram of a hardware configuration for an exemplary embodiment.

To provide context for the various aspects presented, a diagram of the hardware configuration of one possible embodiment is shown in FIG. 2. Lens 201 focuses light energy from the scene being imaged onto the image sensor 203 through the Bayer image filter 205. The action of the Bayer grid is to subsample the green wavelengths by a factor of two and the red and blue wavelengths by a factor of four, resulting in Bayer image 101. The sensor's analog electrical output is subsequently digitized by the A to D converter 207 and delivered the digital Video Processor 209 which stores the image data in its associated memory 211 for subsequent processing, including the chromatic aberration correction described here. FIG. 2 also includes a test pattern 221 such as will be discussed further below. In the presented applications, chromatic aberration correction is performed prior to all other processing, improving performance. The discussion is based on a still camera, but readily extends to video and other digital imaging systems.

Figure 3:
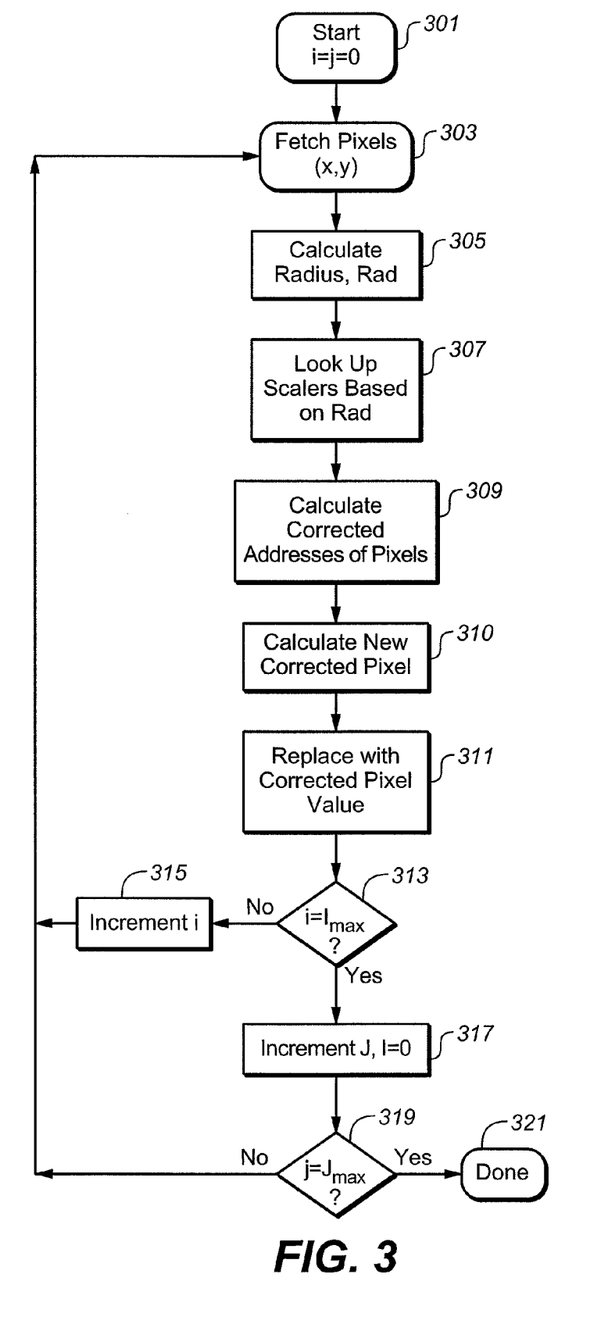
FIG. 3 is a flow chart showing an exemplary aberration correction process.

In the exemplary embodiment, the chromatic aberration correction is accomplished by means of a firmware program executed by the digital Video Processor 209 and acting on the raw digitized Bayer image data 101 in the associated memory array 211. (Alternatively, the process can be executed in hardware, software, or some combination of these and/or firmware.) FIG. 3 depicts the flow of the program execution. For each channel to be corrected, a similar process would be performed; for example, in case of data being in the Bayer image format, the example, this could process for correcting the red channel.

The flow of FIG. 3 begins at 301 by initializing the pixel indices. At 303, for each pixel having coordinates (x,y) in the image memory, the program fetches the components of the pixel for the channel, and calculates an "elliptic radius", rad, relative to the optical center of the image (305) according to:

$$\text{rad} = a(x-x_c)^2 + b(y-y_c)^2 + c(x-x_c)(y-y_c),$$

where (x,y) are current pixel coordinates, $(x_c, y_c)$ are coordinates of the optical center, and a,b,c indicate the shape of the distortion shape of the channel. This particular embodiment is based on the assumption that any chromatic aberrations are manifested in some form of ellipse or other conic section (circular, elliptic and hyperbolic shapes are supported). Since digital camera lens aberrations tend to be spherical in nature, this will usually be sufficiently accurate, leads to a simpler look-up table for any correction factors and requires fewer points to be gathered during the calibration process. More general embodiments, using a circumferentially asymmetric chromatic aberration pattern, may also be used. Note that in many embodiments, a given pixel may not have components in all channels; for example, in the main embodiment used for discussion here, a Bayer image is used, where each pixel has only a single component (either red, green, or blue).

The elliptic radius is then used at 307 to locate the red and blue correction scalars, Sc, in a look-up table that was built during the lens calibration procedure. The scalars are then applied to modify the elliptic radius individually for the red and blue pixel components: Sc=LUT[Rad], where LUT is the LUT of the channel from the modified radii, the corrected addresses for these components are calculated at 309:

$$\text{new}\_x = Sc*(x-x_c) + x_c; \text{new}\_y = Sc*(y-y_c) + y_c,$$

$$\text{delta}\_x = \text{new}\_x - x; \text{delta}\_y = \text{new}\_y - y,$$

where delta_x and delta_y indicate the location of the corrected pixel relative to the current pixel location (x,y). In a typical embodiment, delta_x and delta_y are limited to the range of [−4 to 4], as the process uses a window of 9×9 around the current pixel, and the changed should not exceed this window. Note delta_x and delta_y need not be integers, as they usually have fractional part, which means that the location of the new pixel can fall in-between pixels.

The new corrected pixel is calculated at 310. Using the integer part of delta_x and delta_y, the four pixels of the same channel that are closest to location of the new corrected pixel are identified. These four nearest pixels can be labeled (pixel_tl, pixel_tr, pixel_bl, pixel_br), where the letters are for top, bottom, right and left, for reference. Using a bi-linear interpolation, for example, to calculate the value of the new corrected pixel from the values of the 4 closest pixels gives:

new_pixel=alpha*beta*pixel_br+
(1−alpha)*beta*pixel_bl i.+
alpha*(1−beta)*pixel_tr+
(1−alpha)*(1−beta)*pixel_tl, where alpha and beta are derived from the fractional part of delta_x and delta_y. The interpolation can use any of the standard types interpolation, such as the bi-linear interpolation noted above, to extract the values of the new corrected pixels. At 311, the image is written back to the memory, replacing the current pixel with the new corrected pixel calculated according to the above.

Steps 313, 315, 317, and 319 increment the process through the array until it is completed at 321. It is usually preferable to perform the scaling on the linear image in the early stages of the image-processing pipe, prior to color interpolation (i.e. demosaicing), edge enhancement, etc., in order to achieve maximum quality of chromatic aberration correction.

As noted above, the process FIG. 3 is executed for each of the channels to be corrected. Thus, in the example of correcting the red and blue channel with respect to the green channel, the process would be performed for the red (r) channel, having an optical center $(x_{cr}, y_{cr})$, parameters $a_r$, $b_r$, and $C_r$ for the distortion shape, and a $LUT_r$ for the scaling factors. The process would then also be performed for blue (b) channel, but with optical center $(X_{cb}, Y_{cb})$, parameters $a_b$, $b_b$, and $C_b$ for the distortion shape, and a look up table $LUT_b$. When, as here with blue and red, multiple channels are being corrected, they can be done in any order or concurrently.

Calibration Procedure

One of the major aspects presented here is a calibration procedure used to determine the correction factor look-up tables. For the correction process above, these would include the optical center $((x_c, y_c))$, distortion shape $((a,b,c))$, and the LUT of scalars for each channel being corrected. The procedure is described in the context of the correction process described above, but may be applied more generally to other in camera correction schemes. The calibration procedure has the user capture an image using the lens for which the correction factors are desired. Since the amount of aberration typically changes based on focus as well, accuracy can be improved by focusing the lens on both a near and a far object As the specifics of the aberrations, and consequently the correction factors, will change as the focal length of a zoom lens is changed, for a zoom lens the calibration procedure preferable captures images for, say, 3 or more zoom positions to account for these variations. Accuracy will again be improved by focusing the lens on both a near and a far object at each zoom position. For the best accuracy, the scene used for calibration should be one rich in monochromatic transitions.

The calibration can be performed in a number of ways. For example, a page of black text on white background, or other image with a sharp, largely monochromatic transition (e.g., building edge) may be used. Alternatively, the user may compose a scene for the calibration by mounting multiple copies of a test pattern (for example, black circles or cross hatch patterns on a white background) on a blank wall. Providing the same symmetrical pattern at various points in the field of the image, and which traverse all image areas, provides a means of repetitively using a simplified data point acquisition methodology, which during the calibration procedure will reduce required calibration time and processing power. Such a test pattern could be provided with the camera or detachable lens (either already printed out or for the user to print), or available from the Internet or other source for printing out by the user. In a third method, the user may be provided with an attachment for the camera flash which causes the flash to act as a projector, casting a test pattern (for example, multiple groupings of concentric black circles that traverse the entire image area) onto a blank white wall; alternately, the flash could be enabled to provide such a pattern on its own. By having the flash attached or built into the camera or imaging system, the relation of the flash to the lens can be readily established. Each of these three types of calibration test patterns will have a certain degree of accuracy and user impact, with the first suggested scene having the least accuracy, yet the least user involvement, the second having great accuracy but great user involvement, and the third perhaps being the best compromise with high accuracy and low user involvement.

The calibration may also be performed by using multiple images. For example, one copy of a test pattern could be printed out and placed on a wall. The user would then capture an image of the test pattern. If this image does not cover the whole of the frame, which will most likely occur when capturing a wide angle shot with the focus at infinity, one or more additional images can be capture, with the test pattern appearing in different parts of the frame for each of these. The calibration can then rely on all of these capture images. Note that in a variation, a set of parameters can be established and the subsequently refined using later images.

Figure 4:
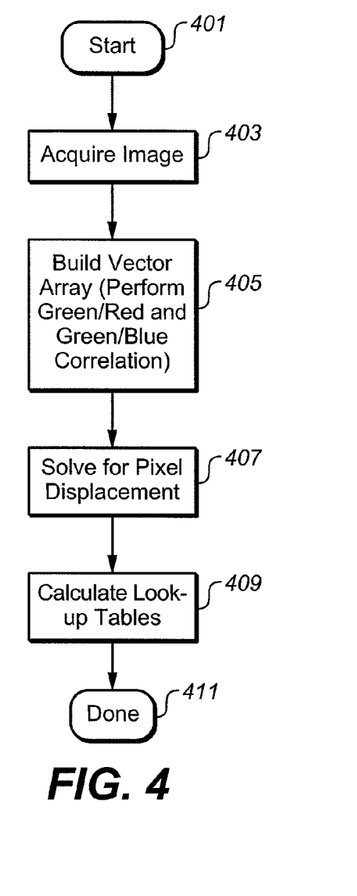
FIG. 4 is a flow chart of an exemplary calibration procedure.
Figure 5:
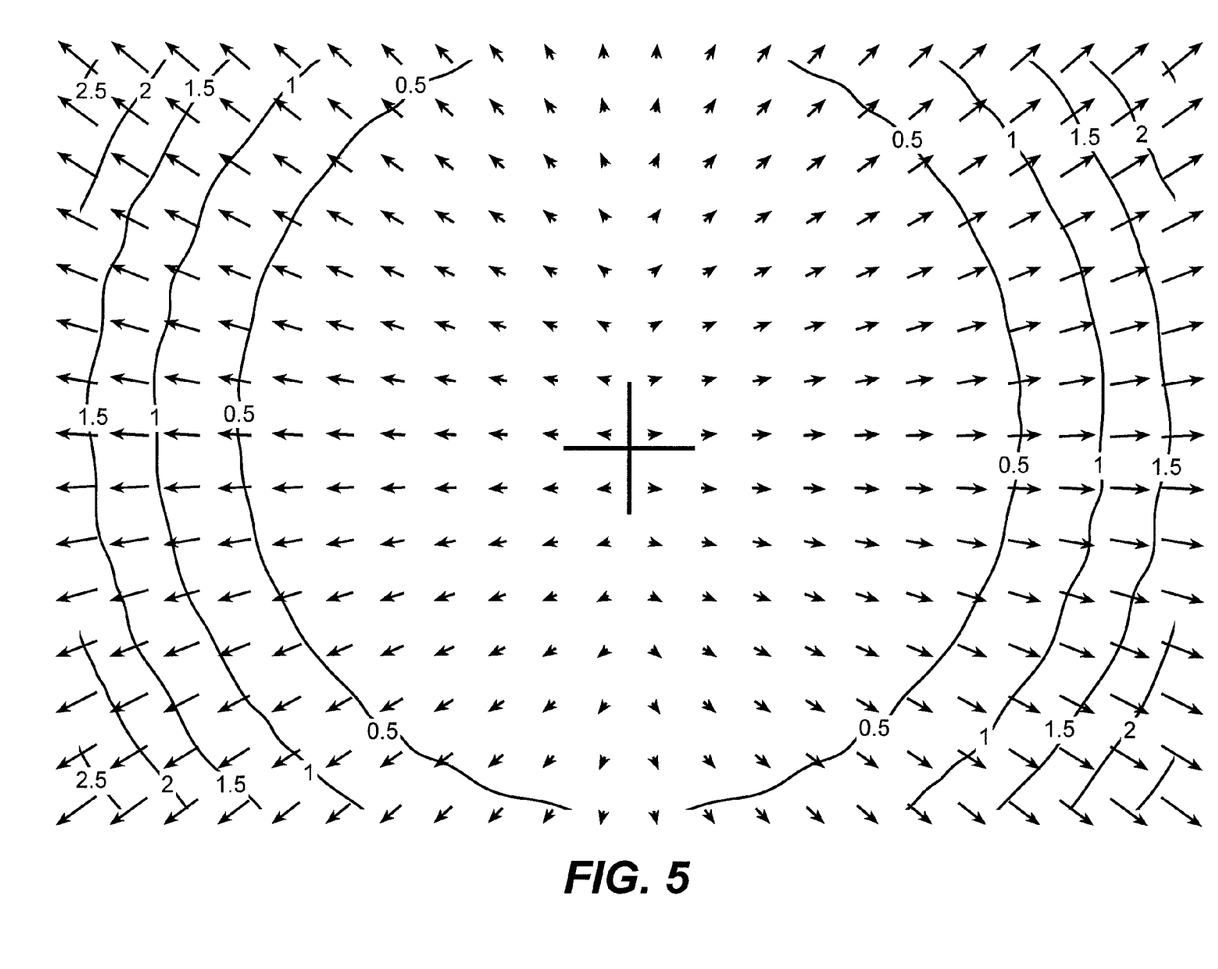
FIG. 5 shows an example of a displacement vector array.

FIG. 4 is a flow diagram for an example of the calibration process using green as the reference channel to correct red and blue channels and starts at step 401. Once the image acquisition is at 403, the image data is scanned. By correlating the transitions in the green component of the images with the red and the blue, the procedure determines chromatic aberration information by generating (405) a vector array of the displacements of the red and blue elements from the green, such as shown in FIG. 5. The correlating can be done, for example, by detecting abrupt transitions that represent the edges of the figures in the test pattern or finding the scaling factors that maximize the correlation between the different channels over the whole image.

FIG. 5 shows an example of a displacement vector a first color channel (here the blue channel) relative to the reference (green) channel. The crosshatch mark (+) indicates the optical center and the arrows indicate the magnitude and direction of relative displacement of the channel at various points due to chromatic aberration effects. The roughly circular boundaries show surfaces of uniform relative displacement (indicated 0.5, 1, 1.5, and so on) expressed in terms of pixels. Thus, for example, to correct along the "1" boundary would use a one pixel displacement of back towards the optical center for the pixels lying on this boundary. The vector array data can be used to solve (407) for the amount of pixel displacement. Standard optimization/approximation techniques, such as steepest descent, can be used to find the parameters best approximating the vector map. From this approximation, the various look-up tables described above (optical center, shape parameters, scalars) are generated (409) for the red and blue channels. The size of the look up tables can be reduced by containing members corresponding to sampled value of the elliptic radius. If a particular value of the elliptic radius is not represented in the tables, the two members corresponding to the two closest values of the elliptic radius can be extracted and a linear interpolation is performed to calculate the needed factor. It should again be noted that although the present invention is described in terms particular embodiments for expository purposes, it is not limited to any specific parameterization of the vector map or any specific approximation/optimization technique for extracting parameters from the vector map.

As noted above, in one set of embodiments, the test pattern can be produced by an attachment to a flash, allowing the flash apparatus to generate and project the test pattern on to a surface. Alternately, the flash itself could have a special setting configured to generate a test pattern for projection. In embodiments where a printed test pattern is used, this could be provided by the supplier (such as the manufacturer, distributor, or retailer) of the camera or software could be provided that would allow the end user to print out a test pattern. It should also be noted that although the described processes have been discussed in the context of chromatic aberration, many of the described techniques, particularly with respect to the on-camera calibration, are more generally applicable. For example, the described use of a test pattern, whether through the flash mechanism or printed or other test patterns could be used to calibrate for monochromatic aberrations (e.g. barrel distortion) as well.

Discussion and Conclusion

As noted in the Background, there are a number of known prior art techniques that employ one color channel (such as green in a RGB breakdown) as a reference channel and compensate the other channels (such as red fu'ld blue) with respect to this reference channel, outside of the image processing pipe, using some sort of standard image scalars. There are, however, a number of shortcomings with these approaches relative to the exemplary embodiments given above. For example, such methods typically support only a constant scaling factor along the radius, whereas the methods presented here will support scaling factors which are not necessarily constant or linear according to the radius, r, and therefore will be able to achieve better results. Additionally, standard image scalars may not be able to work on a linear Bayer image, only on the full, color interpolated RGB image. Such scalars will achieve lower quality results than the exemplary embodiments presented here, since they are done after color interpolation, while in an implementation of the technology described herein, the color interpolation is done on pixels that have already been corrected for chromatic aberration. Further, prior art approaches will usually make image processing time much longer, and lengthen the "click to click time" of the digital camera.

Although the calibration method is more widely applicable, it is particularly effective when used in conjunction with the exemplary correction process. The incorporation of the in-camera field calibration procedure provides the data necessary to effect chromatic aberration correction from an acquired reference image, and thereby does not require, for exanlple, the taking lens to provide lens characteristics data to the aberration correction process. Further, although the calibration is process is described primarily as an in-camera process, the calibration can also be performed outside the camera (using a PC, for example) and then loading the correction factors onto the camera.

Even though the described techniques may be implemented outside the camera, they may be particularly advantageously employed in an on-camera process. An on-camera process allows chromatic aberrations to be corrected in the beginning of the processing pipe, before demosaicing, color reproduction, noise reduction, and other common processing steps. This typically provides for a better result in image quality. It also allows the end user to obtain a corrected image immediately after capture, without having to go through a later phase of correcting chromatic aberration on the user's PC, which is more convenient. From the manufacturer's perspective, it also has the potential advantage that, as the user does not see the non-corrected image, the user is not exposed to the true lens quality.

It should also be noted that the calibration process need not be separate operation, but combined with the actual capture of an image. That is, although the discussion above has been given in the (often implicit) context of acquiring the correction factors from a first image (such as the test pattern) and then using these correction factors for any subsequent images, in some embodiments the correction factors could be extracted from the image of interest and then used to correct this image itself. For example, when the user captures an image (as opposed to a test pattern), the aberration information could be extracted from the image, correction factors determined and then applied to the image itself As an initial, non-test pattern image will often not provide as accurate a set of correction factors, these could be refined based on additional images captured by the user to successively improve the accuracy. Even when a first image is used to determine correction factors that are then used on a second image, the first and second images may be related; for example, the first image could be a preview image, including the case where the first image is an earlier image from a series of images, such as in the case of a series of frames of video.

Although much of the preceding discussion has been in the context of the calibration process being performed by an end user of the camera, part or all of the process may also be performed by a supplier (such as the manufacturer, distributor, or retailer) of the camera. In this form any lens provided with the camera, including the fixed lens case, the calibration would already have been completed when the user acquires the camera and any additional calibration by the user would be for additional lens or if a re-calibration was needed for some reason.

Although the various aspects of the present invention have been described with respect to exemplary embodiments thereof, it will be understood that the present invention is entitled to protection~within the full scope of the appended claims.

What is claimed is:

1. A method comprising:
   determining a lateral chromatic aberration correction factor based on chromatic aberration information extracted from image data acquired using a first lens of a first imaging system, wherein the lateral chromatic aberration information is determined based on displacement of a second channel of a chromatic decomposition of the image data relative to a first channel of the chromatic decomposition of the image data; and
   loading the lateral chromatic aberration correction factor on a second imaging system separate from the first imaging device for use in correcting chromatic aberration in the second imaging system.

2. The method of claim 1, where in the correction factor is for a point radially located from an optical center of the image data and the correction factor is based on displacement of at least one other channel of the chromatic decomposition of the first image data relative to the first channel of the chromatic decomposition of the first image data at the point.

3. The method of claim 1, further comprising:
   acquiring second image data using the second imaging system having the second lens; extracting chromatic aberration information for the second lens from the second image data; and
   updating the correction factor for the second lens based on a second channel of a chromatic decomposition of the second image with respect to a first channel of the chromatic decomposition of the second image.

4. The method of claim 1, further comprising:
   storing the correction factor as a look up table on the second imaging system.

5. The method of claim 1, further comprising:
   performing, in the second imaging system, an image correction process of an image capture by the second imaging system using the correction factor.

6. The method of claim 1, wherein the image data is a monochromatic test pattern.

7. The method of claim 1, wherein the method is initiated by a supplier of the second imaging system.

8. A method comprising:
   acquiring first image data using a first imaging device having a first lens;
   extracting lateral chromatic aberration information for the first lens from the first image data;
   determining a correction factor for the first lens for a second channel of a chromatic decomposition of the first image data with respect to a first channel of the chromatic decomposition; and
   loading the correction factor on a second imaging device separate from the first imaging device for use in correcting chromatic aberration in the second imaging device.

9. The method of claim 8, wherein the chromatic aberration information indicates displacement of at least one other channel of the chromatic decomposition of the first image data relative to the first channel of the chromatic decomposition of the first image data.

10. The method of claim 8, where in the correction factor is for a point radially located from an optical center of the first image and the correction factor is based on displacement of at least one other channel of the chromatic decomposition of the first image data relative to the first channel of the chromatic decomposition of the first image data at the point.

11. The method of claim 8, further comprising:
    acquiring second image data using the second imaging device having the second lens; extracting chromatic aberration information for the second lens from the second image data; and
    updating the correction factor for the second lens based on a second channel of a chromatic decomposition of the second image with respect to a first channel of the chromatic decomposition.

12. The method of claim 8, further comprising:
    storing the correction factor as a look up table on the second imaging device.

13. The method of claim 8, further comprising:
    performing an on-imaging device image correction process of an image captured by the second imaging device using the correction factor.

14. The method of claim 8, wherein the first image data is a monochromatic test pattern.

15. The method of claim 8, wherein the method is initiated by a supplier of the second imaging device.

16. A method for correcting chromatic lens aberrations in an imaging system, comprising:
    using a first lens to acquire image data for a first image;
    extracting chromatic aberration information for the first lens from the acquired image data, wherein the chromatic aberration information indicates displacement of a second channel of a chromatic decomposition of the first image data relative to a first channel of the chromatic decomposition of the first image data;
    determining, for a point radially located from an optical center of the first image, a correction factor for the first lens for the second channel of the chromatic decomposition of the first image with respect to the first channel of the chromatic decomposition based on the displacement of the second channel of the image data at the point; and
    loading the correction factor on a second imaging device separate from the first imaging device for use in correcting chromatic aberration in the second imaging device.

17. The method of claim 16, further comprising:
    acquiring second image data using the second imaging device having the second lens; extracting chromatic aberration information for the second lens from the second image data; and
    updating the correction factor for the second lens based on a second channel of a chromatic decomposition of the second image with respect to a first channel of the chromatic decomposition.

18. The method of claim 16, further comprising:
    storing the correction factor as a look up table on the second imaging device, wherein the look up table.

19. The method of claim 16, further comprising:
    performing an on-camera image correction process of an image captured by the second imaging device using the correction factor.

20. The method of claim 16, wherein the first image data is a monochromatic test pattern.

21. The method of claim 16, wherein the method is initiated by a supplier of the second imaging device.

22. A method comprising:
in a first imaging device, acquiring image data from a first image projected onto an image sensor of the first imaging device through a lens;
applying, by an image processor, a lateral chromatic aberration correction factor to a pixel of the image data based on a displacement of the pixel relative to a predefined location in the first image, wherein the lateral chromatic aberration correction factor has been loaded on the first imaging device and corresponds to a characteristic of the lens;
wherein the lateral chromatic aberration correction factor was determined by a second imaging device separate from the first imaging device prior to being loaded on the first imaging device.

23. The method of claim 22, wherein the second imaging device has a lens that has a chromatic aberration characteristic deemed similar, according to a specified criterion, to a chromatic aberration characteristic of the imaging device.

24. The method of claim 23, wherein the lateral chromatic aberration correction factor was determined by the second imaging device based on a displacement of a second channel of a chromatic decomposition of test image data, acquired using the lens of the second imaging device, relative to a first channel of the chromatic decomposition of the test image data.

25. The method of claim 22, further comprising:
extracting chromatic aberration information for the lens from the image data; and
revising the lateral chromatic aberration correction factor for the lens based on the chromatic aberration information extracted from the image data, wherein the extracting of chromatic aberration information for the lens from the image data and the revising are performed by an image processor in the first imaging device.

26. The method of claim 25, further comprising:
applying, by the image processor in the first imaging device, the revised lateral chromatic aberration correction factor to the pixel of the image data based on the displacement of the pixel relative to the optical center of the first image.

27. The method of claim 22, wherein the lateral chromatic aberration correction factor is stored as a look up table in a memory in the first imaging device.

28. A imaging device comprising:
a lens;
an image sensor onto which the lens projects a first image, wherein in operation, the image sensor provides image data for the first image;
a memory storing a lateral chromatic aberration correction factor; and
an image processor electrically coupled with the image sensor and the memory, wherein in operation, the image processor
receives the image data,
applies the lateral chromatic aberration correction factor to a pixel of the image data based on a displacement of the pixel relative to a predefined location in the first image,
extracts chromatic aberration information for the lens from the image data, and
revises the lateral chromatic aberration correction factor for the lens based on the chromatic aberration information extracted from the image data,
wherein the lateral chromatic aberration correction factor has been loaded on the imaging device and corresponds to a characteristic of the lens.

29. The imaging device of claim 28, wherein in operation, the on-imaging device image processor further applies the revised lateral chromatic aberration correction factor to the pixel of the image data based on the displacement of the pixel relative to the optical center of the first image.

30. The imaging device of claim 28, wherein the lateral chromatic aberration correction factor is stored as a look up table.

* * * * *